United States Patent Office 2,723,277
Patented Nov. 8, 1955

2,723,277

MALONIC ACID DERIVATIVES AND PROCESS FOR THE MANUFACTURE THEREOF

André Grüssner and Balthasar Hegedüs, Basel, Switzerland, assignors to Hoffmann-La Roche Inc., Nutley, N. J., a corporation of New Jersey No Drawing. Application August 14, 1953, Serial No. 374,445

Claims priority, application Switzerland August 26, 1952

The portion of the term of the patent subsequent to February 8, 1972 has been disclaimed 7 Claims. (Cl. 260—343.2)

The present invention concerns novel malonic acid derivatives and a process for the manufacture thereof. The said malonic acid derivatives are useful because of their inhibiting action on the coagulation of blood or as intermediates in the manufacture of substances with such activity.

The process provided by the invention comprises condensing an alkali metal compound of the general formula

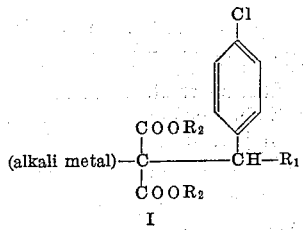

I wherein $R_1$ represents an alkyl radical having not more than 3 carbon atoms, preferably a methyl, ethyl or propyl radical, and $R_2$ stands for a lower alkyl group, e. g. a methyl or ethyl group, with an acetyl-salicylic acid halide, preferably the chloride, to form a condensation product of the general formula

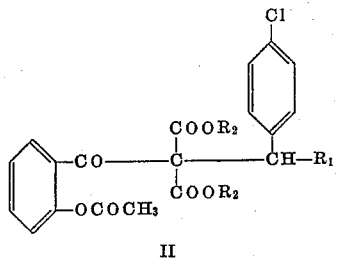

II and heating the said condensation product with a cyclizing and hydrolyzing agent, such as for example an alkali alcoholate, preferably sodium methylate, in an organic solvent, e. g. benzene or ether, so as to produce a coumarin derivative of the general formula

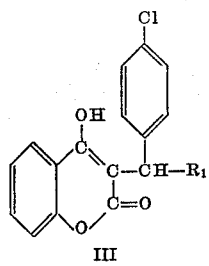

III

The starting materials, i. e. [1'-(p-chlorophenyl)-alkyl]-malonic acid dialkyl esters, more particularly [1'-(p-chlorophenyl)-propyl]-malonic acid diethyl ester, may be obtained by reacting p-chloro-benzaldehyde with an alkyl magnesium bromide, for example ethyl magnesium bromide, replacing the hydroxy group in the carbinol formed by halogen (for example, by means of phosphorous tribromide) and condensing the halide thus prepared with a malonic acid ester or, respectively, an alkali salt of the latter.

The intermediate products referred to above are novel compounds which, in a pure state, are colorless. The coumarin derivatives of Formula III are crystallized, stable compounds, which are only slightly soluble in water, but well soluble in the usual organic solvents. They have acidic properties and, accordingly, form water-soluble salts with strong bases. They show a remarkably powerful inhibiting action on the coagulation of blood and may therefore be used in anticoagulating preparations.

*Example* p-Chloro-benzaldehyde is reacted in absolute ether with ethyl magnesium bromide and the 1-(p-chlorophenyl)-propanol formed is treated with phosphorous tribromide. The 1-(p-chlorophenyl)-propyl bromide obtained is condensed in absolute alcohol with diethyl sodium-malonate to produce [1'-(p-chlorophenyl)-propyl]-malonic acid diethylester of boiling point 128–130° C. 0.01 mm.

5.7 parts by weight of powdered sodium are suspended in 200 parts by volume of absolute benzene, whereupon 93 parts by weight of [1'-(p-chlorophenyl)-propyl]-malonic acid diethylester are added within 3 hours at 18–25° C. Once all the sodium powder is dissolved, 49 parts by weight of acetylsalicylic acid chloride are added dropwise within 1 hour at 25–35° C., whereupon the solution is heated for 1 hour with stirring.

The reaction mixture is cooled down to 35° C., 30 parts by weight of sodium methylate are added portionwise with stirring, whereafter the mixture is stirred for 3–4 hours at 45–50° C. The reaction mixture is dispersed between benzene and water, the alkaline aqueous solution is made Congo acid by means of dilute mineral acid, such as hydrochloric acid, and the 3-[1'-(p-chlorophenyl)-propyl]-4-hydroxy-coumarin precipitated is collected. After having been recrystallized in ethanol or butyl oxide, it melts at 186–188° C.

We claim:

1. A process which comprises condensing an alkali metal compound of the general formula

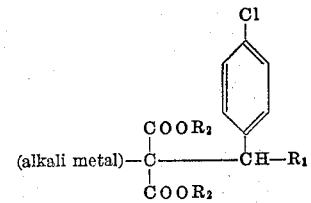

wherein $R_1$ represents an alkyl radical having not more than 3 carbon atoms, and $R_2$ stands for a lower alkyl group, with acetyl-salicylic acid chloride to form a condensation product of the general formula

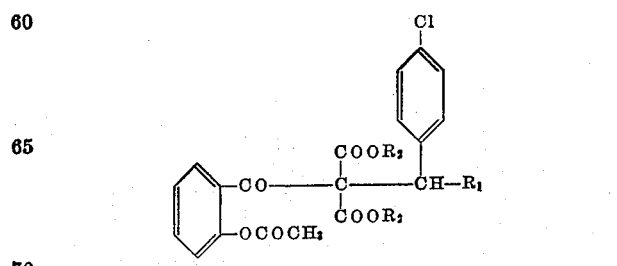

$R_1$ and $R_2$ having the same meaning as above, and heating the said condensation product with an alkali alcoholate so as to produce a coumarin derivative of the general formula

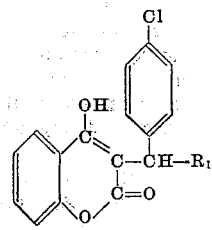

$R_1$ having the same meaning as above.

2. The process of claim 1, wherein the cyclizing and hydrolyzing agent is sodium methylate.
3. The process of claim 1, wherein the reaction is carried out in the presence of an inert solvent.
4. The process of claim 1, wherein the reaction is carried out in the presence of benzene.
5. A compound of the general formula

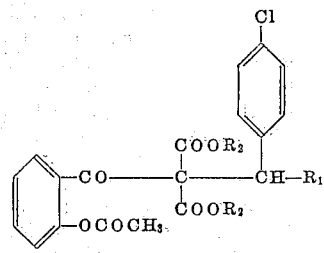

wherein $R_1$ represents an alkyl radical having not more than 3 carbon atoms, and $R_2$ stands for a lower alkyl group.

6. 1 - [o - acetoxy - benzoyl] - 1 - [1' - (p - chlorophenyl)-propyl]-malonic acid diethylester.

7. A process of making a compound having the general formula

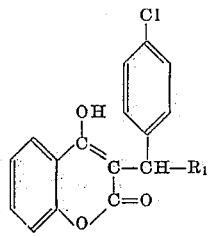

wherein $R_1$ represents an alkyl radical having not more than 3 carbon atoms which comprises heating a compound having the formula

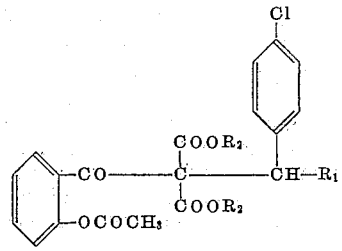

wherein $R_1$ has the same meaning as above and $R_2$ represents a lower alkyl radical with an alkali alcoholate.

References Cited in the file of this patent
UNITED STATES PATENTS

| | | |
|---|---|---|
| 2,349,765 | Shelton et al. | May 23, 1944 |
| 2,471,047 | Stahmann et al. | May 24, 1949 |
| 2,648,682 | Stoll et al. | Aug. 11, 1953 |
| 2,648,683 | Litvan et al. | Aug. 11, 1953 |

OTHER REFERENCES

Anschutz: Annalen, vol. 367, pp. 174, 225–26 (1909).